US011532238B2

(12) United States Patent
Prosser

(10) Patent No.: US 11,532,238 B2
(45) Date of Patent: Dec. 20, 2022

(54) CUSTOM AIRCRAFT TRAJECTORY WITH A TERRAIN AWARENESS AND WARNING SYSTEM

(71) Applicant: Gulfstream Aerospace Corporation, Savannah, GA (US)

(72) Inventor: Kevin Prosser, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 161 days.

(21) Appl. No.: 16/454,838

(22) Filed: Jun. 27, 2019

(65) Prior Publication Data

US 2020/0410877 A1  Dec. 31, 2020

(51) Int. Cl.
| | |
|---|---|
| *G08G 5/00* | (2006.01) |
| *B64D 45/04* | (2006.01) |
| *G08G 5/04* | (2006.01) |
| *G07C 5/08* | (2006.01) |

(52) U.S. Cl.
CPC ........... *G08G 5/0086* (2013.01); *B64D 45/04* (2013.01); *G07C 5/0808* (2013.01); *G08G 5/045* (2013.01)

(58) Field of Classification Search
None
See application file for complete search history.

(56) References Cited

U.S. PATENT DOCUMENTS

| 8,744,738 | B2 * | 6/2014 | Bushnell | G08G 5/045 |
| | | | | 701/4 |
| 9,607,521 | B2 * | 3/2017 | Coulmeau | G08G 5/003 |
| 9,633,567 | B1 * | 4/2017 | Skoog | G06F 30/20 |
| 2001/0056316 | A1 * | 12/2001 | Johnson | G08G 5/045 |
| | | | | 701/14 |
| 2007/0050101 | A1 * | 3/2007 | Sacle | B64D 45/0031 |
| | | | | 701/11 |
| 2008/0177432 | A1 * | 7/2008 | Deker | G05D 1/0676 |
| | | | | 701/17 |

(Continued)

FOREIGN PATENT DOCUMENTS

| EP | 1517281 A2 * | 3/2005 | ........... G08G 5/0078 |
| EP | 1832850 A1 | 9/2007 | |

OTHER PUBLICATIONS

"Gahan, Kenneth C., "Multi-Path Automatic Ground Collision Avoidance System for Performance Limited Aircraft with Flight Tests: Project Have Medusa" (Mar. 21, 2019), Air Force Institute of Technology Theses and Dissertations, Pertinent Pages cited within detailed action" (Year: 2019).*

(Continued)

*Primary Examiner* — James J Lee
*Assistant Examiner* — Tawri M Matsushige
(74) *Attorney, Agent, or Firm* — LKGlobal | Lorenz & Kopf, LLP

(57) ABSTRACT

Avionics systems, aircraft, and methods are provided. An avionics system for an aircraft includes a trajectory modeling system and a Terrain Awareness Warning System (TAWS). The trajectory modeling system is programmed to determine a current performance capability of the aircraft and to generate potential escape data based on the current performance capability of the aircraft. The TAWS is programmed to generate a terrain margin using a TAWS algorithm based on the potential escape data and to generate a warning based on the terrain margin.

15 Claims, 5 Drawing Sheets

(56) References Cited

U.S. PATENT DOCUMENTS

| | | | |
|---|---|---|---|
| 2008/0208400 A1* | 8/2008 | Bouchet | G08G 5/045 |
| | | | 701/4 |
| 2009/0132103 A1* | 5/2009 | Marty | G01C 21/00 |
| | | | 701/3 |
| 2010/0042273 A1* | 2/2010 | Meunier | G05D 1/0676 |
| | | | 701/9 |
| 2015/0154873 A1* | 6/2015 | Sawhill | G08G 5/0052 |
| | | | 701/122 |
| 2015/0266591 A1 | 9/2015 | Petillon | |
| 2017/0018196 A1* | 1/2017 | Shay | G08G 5/0039 |

OTHER PUBLICATIONS

"Trombetta, John V., "Multi-Trajectory Automatic Ground Collision Avoidance System with Flight Tests (Project Have Escape)" (Mar. 2016), Air Force Institute of Technology Thesis, Section III Methodology" (Year: 2016).*

\* cited by examiner

CUSTOM AIRCRAFT TRAJECTORY WITH A TERRAIN AWARENESS AND WARNING SYSTEM

TECHNICAL FIELD

The present disclosure generally relates to terrain awareness and warning systems for aircraft, and more particularly relates to providing custom aircraft trajectories to a terrain awareness and warning system.

BACKGROUND

Conventional Terrain Awareness Warning Systems (TAWS) utilize a single forward look ahead volume based on the current path of the aircraft. The systems are based on assumed performance capabilities and limitations for generic aircraft. Such assumed capabilities and limitations mean the systems are not responsive to real time performance capabilities/limitations of aircraft. For example, the aircraft may be operating with only a single engine or may be heavier than the weight in the assumptions. Therefore, the assumptions are sometimes optimistic and at other times are pessimistic.

Providing a warning of impending terrain impact requires a knowledge of the terrain near the vehicle and insight into the future position of the vehicle in relation to that terrain. Traditional methods of gaining insight into the future position of the vehicle have relied on an extrapolation of current position using current trajectory data and/or current trajectory expanded to include some amount of uncertainty. The terrain along that path is then determined by scanning a terrain database along that path and a warning or caution is issued if terrain penetrates the path by some predetermined threshold. This method assumes the vehicle intends to continue along its current trajectory. If, however, the vehicle will not proceed along its current trajectory, any terrain warnings along that path would be unnecessary and be considered nuisances. A curved arrival procedure to an airport in mountainous terrain presents just such a problem. The curving arrival is constructed in such a way as to guarantee terrain separation by turning the aircraft prior to reaching a terrain obstruction. Prior to reaching each turn point, however, the vehicle (aircraft in this case) will have an instantaneous trajectory toward the terrain. Any terrain warning system that warns of terrain by extrapolating the current trajectory will unnecessarily issue a terrain warning under these circumstances. Conventional TAWS reduce nuisance warnings in mountainous areas by shrinking the look ahead distance. Shrinking the look ahead distance, however, reduces protection for the aircraft.

One way to provide effective terrain awareness without generating unnecessary nuisance warnings is to have insight into the future maneuvers of the vehicle. If the future maneuver provides adequate terrain separation there would be no need for a terrain warning. Many attempts at determining the vehicles intent have failed as the vehicle is not able to reliably determine an operator's intent with certainty. Furthermore, the operator's intent often changes during flight, and any previously determined intent may quickly become unreliable.

SUMMARY

Avionics systems, aircraft, and methods are provided. In a first example, an avionics system for an aircraft includes a trajectory modeling system and a Terrain Awareness Warning System (TAWS). The trajectory modeling system is programmed to determine a current performance capability of the aircraft and to generate potential escape data based on the current performance capability of the aircraft. The TAWS is programmed to generate a terrain margin using a TAWS algorithm based on the potential escape data and to generate a warning based on the terrain margin.

In a second example, an aircraft includes a trajectory modeling system and a Terrain Awareness Warning System (TAWS). The trajectory modeling system is programmed to determine a current performance capability of the aircraft and to generate potential escape data based on the current performance capability of the aircraft. The TAWS is programmed to generate a terrain margin using a TAWS algorithm based on the potential escape data and to generate a warning based on the terrain margin.

In a third example, a method includes performing tasks with a trajectory modeling system and with a Terrain Awareness Warning System (TAWS). Performing tasks with the trajectory modeling system includes determining a current performance capability of an aircraft and generating potential escape data based on the current performance capability of the aircraft. Performing tasks with the TAWS includes generating a terrain margin using a TAWS algorithm based on the potential escape data and includes generating a warning based on the terrain margin.

BRIEF DESCRIPTION OF THE DRAWINGS

Advantages of the systems and method described herein will be readily appreciated, as the same becomes better understood by reference to the following detailed description when considered in connection with the accompanying drawings wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Various embodiments disclosed herein describe methods and systems for evaluating terrain conflicts based on actual aircraft capabilities and limitations. An exemplary embodiment evaluates multiple potential escape maneuvers that reflect the actual capability of the host vehicle in order to determine when a terrain warning is appropriate. The exemplary embodiment predicts one or more potential escape trajectories using actual current maneuver and performance capability of the vehicle to determine the range of possible future positions of the vehicle. These future positions would then be compared to the terrain in those locations using traditional terrain scanning methods. If any of the potential escape maneuvers has adequate terrain margin, the system would not provide a terrain warning as one escape trajectory is still viable and available to the vehicle operator. If none of the potential escape maneuvers provides the desired minimum terrain separation, then a terrain warning would be issued. Varying levels of awareness can be used based on the amount of terrain clearance on the trajectory with the most terrain clearance.

Figure 1:
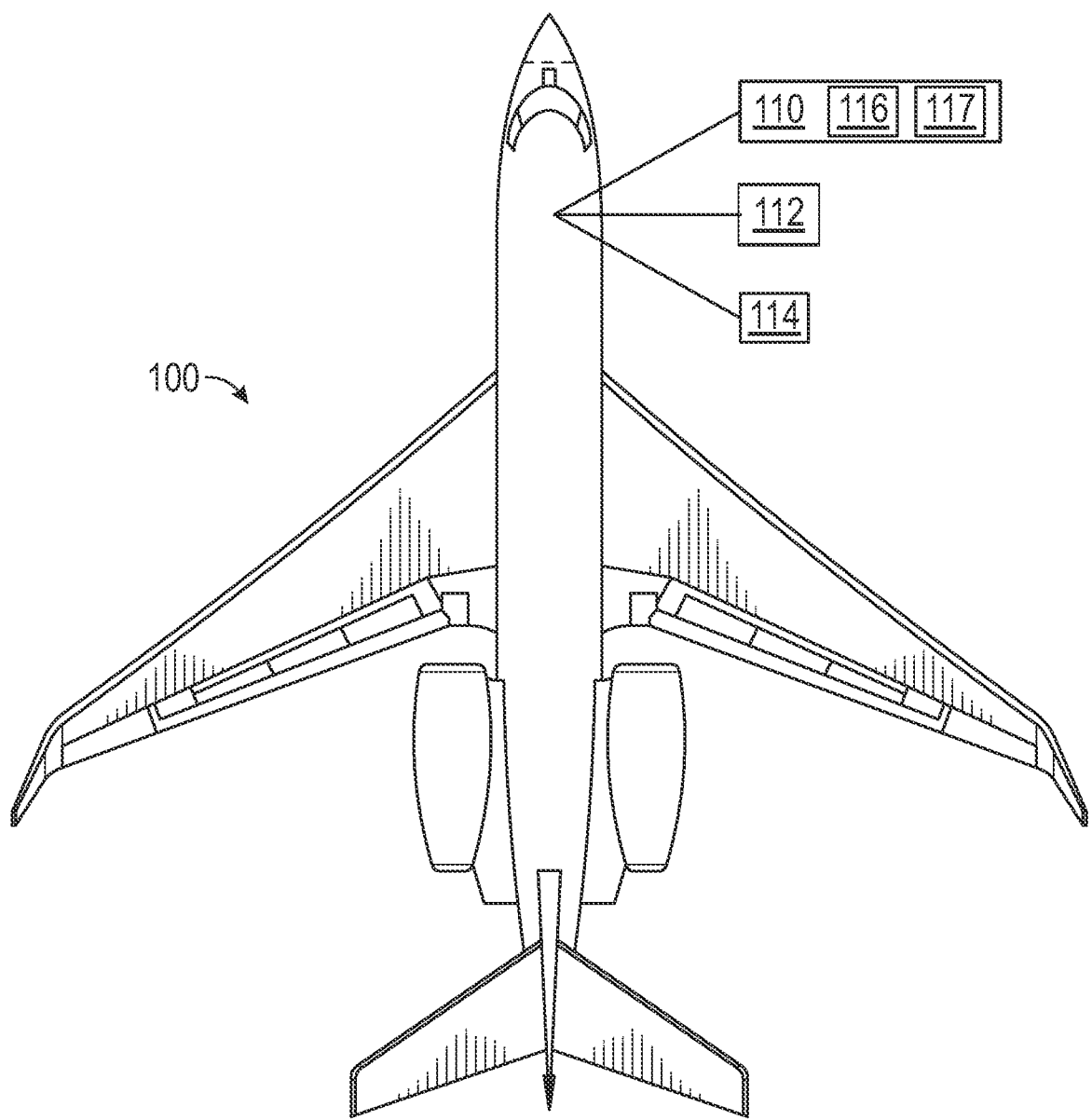
FIG. 1 is a schematic diagram illustrating an aircraft having a control system, in accordance with various embodiments.

Referring now to FIG. 1, an example of an aircraft 100 is illustrated in accordance with some embodiments. Aircraft 100 includes a control system 110, a sensor system 112, and an alarm system 114, among other systems. Although aircraft 100 is described in this description as an airplane, it should be appreciated that control system 110 may be utilized in other aircraft, land vehicles, water vehicles, space vehicles, or other machinery without departing from the scope of the present disclosure. For example, control system 110 may be utilized in submarines, helicopters, airships, spacecraft, or automobiles.

Control system 110 is an avionics system configured to operate aircraft 100 and to perform tasks of the methods described below. Control system 110 includes a potential escape trajectory modeling system 116 and a Terrain Awareness Warning System (TAWS) 117, as will be described below. Control system 110 further includes at least one processor (not illustrated) and a non-transitory computer readable storage device or medium (not illustrated). The non-transitory computer readable storage device or medium is storage device for storing instructions for performing the method described below. The at least one processor is one or more data processors configured to execute the instructions to perform the method described below. The processor may be any custom made or commercially available processor, a central processing unit (CPU), a graphics processing unit (GPU), an auxiliary processor among several processors associated with control system 110, a semiconductor based microprocessor (in the form of a microchip or chip set), a macroprocessor, any combination thereof, or generally any device for executing instructions. The computer readable storage device or medium may include volatile and nonvolatile storage in read-only memory (ROM), random-access memory (RAM), and keep-alive memory (KAM), for example. The computer-readable storage device or medium may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by control system 110 in controlling aircraft 100.

The instructions may include one or more separate programs, each of which comprises an ordered listing of executable instructions for implementing logical functions. The instructions, when executed by the processor, receive and process signals from the sensor system, perform logic, calculations, methods and/or algorithms for automatically controlling the components of aircraft 100, and generate control signals for the components of aircraft 100 based on the logic, calculations, methods, and/or algorithms. Although only one control system 110 is shown in FIG. 1, embodiments of aircraft 100 may include any number of control systems 110 that communicate over any suitable communication medium or a combination of communication media and that cooperate to process the sensor signals, perform logic, calculations, methods, and/or algorithms, and generate control signals to automatically control features of aircraft 100.

In various embodiments, one or more instructions of control system, when executed by the processor, performs the methods described below to provide custom trajectories for Terrain Awareness Warning System (TAWS) 117. In the example provided, the instructions provide programming for control system 110 to have the structural features of conventional TAWS and aircraft path prediction systems modified as described herein as appreciated by those with ordinary skill in the art. The TAWS 117 may be any commercially available TAWS used in conventional aircraft modified as described herein.

In the example provided, potential escape trajectory modeling system 116 is a modified version of the system described in U.S. patent application Ser. No. 15/470,776, filed Mar. 27, 2017, and published on Sep. 27, 2018 as US Patent Application Publication number US 2018/0275651, which is incorporated herein by reference. In general, trajectory modeling system 116 described herein is simplified from the prior system to provide data to TAWS 117 for improvements in the functioning of conventional TAWS by incorporating multiple predictive trajectories.

Figure 2:
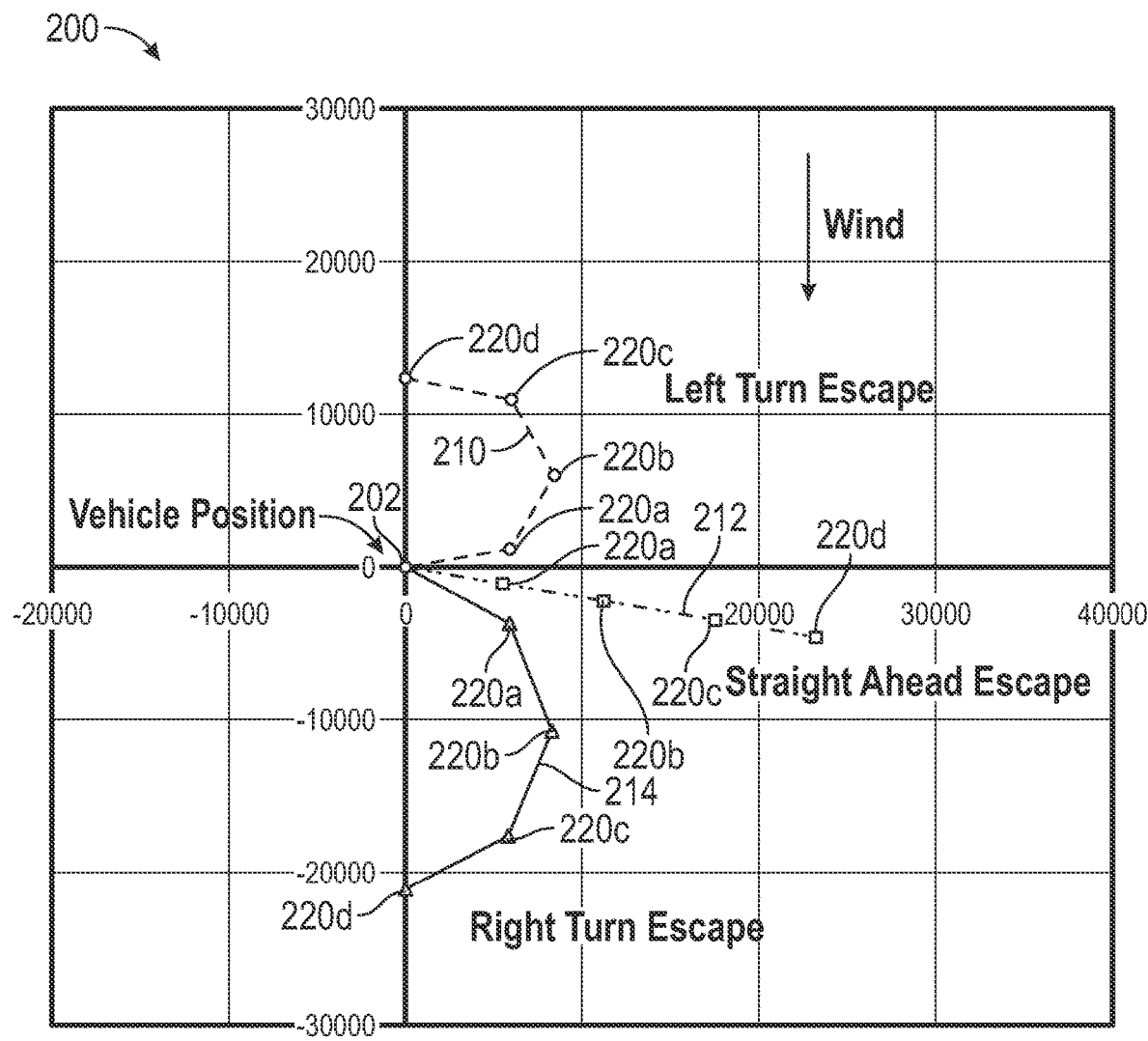
FIGS. 2-4 are simplified diagrams illustrating data utilized by the control system of FIG. 1 in accordance with various embodiments.

Referring now to FIG. 2, and with continued reference to FIG. 1, a path prediction system output 200 is illustrated in accordance with the principles of the present disclosure. The path prediction system generates potential paths along which aircraft 100 may fly from a current position 202. In the example provided, path prediction system output 200 includes a left turn escape 210, a straight ahead escape 212, and a right turn escape 214. Escapes 210, 212, and 214 are calculated paths aircraft 100 may fly based on actual estimated performance characteristics of aircraft 100 at the time of calculation. In some examples, the potential escape trajectories are created using extravagant modeling techniques to determine vehicle roll and pitch response along with thrust/drag effects and sustained climb capability. In some examples, rudimentary modeling techniques and even simple lookup tables are implemented. For example, a TAWS that evaluates the full range of escape options and uses the current performance capability will provide improved protection and generate fewer nuisance warnings than are provided and generated in conventional TAWS. For example, simply knowing the vehicles current climb capability and the bank angle that will be used for any potential escape trajectory is sufficient to predict the future position of the vehicle accurately enough to improve conventional TAWS.

In some examples, trajectory modeling system 116 is simplified to protect against terrain conflicts only. For example, protection against all harms and incorporation of auto-throttle and auto-pilot recoveries may be omitted to permit less computationally intensive calculation of the terrain conflict analysis. In such embodiments, assumptions made in conventional TAWS may be applied to simplify the calculations. For example, trajectory modeling system 116 may assume that a terrain recovery can be immediately initiated without, for example, a preliminary low speed recovery or high bank recovery. In some embodiments, the predictive trajectories are simplified by making some of the assumptions used in conventional TAWS. In some embodiments, simplified trajectories are retrieved by a table lookup.

In the example provided, the three escape maneuver paths are modeled and reduced to four future points along each trajectory. Left turn escape 210 utilizes a climbing left escape maneuver, straight ahead escape 212 utilizes a climbing straight escape maneuver, and right turn escape 214 utilizes a climbing right turn maneuver. It should be appreciated that additional and/or alternative escapes may be calculated based on the processing power available and desired safety margin.

In the example provided, path prediction system does not compute airspeed and Mach limits and is simplified to use legacy methods and rules of thumb to predict the trajectories. Straight ahead escape 212 assumes straight climb and escapes 210 and 214 are computed using straight ahead escape 212 data but turning with 30-degree bank in the zoom climb and sustained climb leg. Such calculations are rapid because the turn escape calculations are similar to the straight escape calculations with a 30-degree bank reducing some of the climb capability.

Each escape 210, 212, 214 is reduced to four predicted positions 220a, 220b, 220c, and 220d along the calculated route. In some embodiments, fewer than four predicted positions may be utilized. In some embodiments, more than four predicted positions may be utilized. It should be appreciated that the number of predicted positions is selected based on the desired resolution of the escape trajectories that are reconstructed by TAWS 117 for evaluation using conventional TAWS algorithms. In some embodiments, the four predicted positions 220a-d are directly calculated without reduction from a more detailed model. In the example provided, the four positions 220a-d are determined using a simple turn radius equation that determines turn radius given the expected recovery airspeed and bank angle according to EQN 1. The vertical dimension of each point is determined from the current altitude and descent rate along with the climb capability in the current configuration found from a lookup table.

$$\text{Radius of turn} = TAS^2/g*\text{Tan(bank angle)} \quad \text{(EQN 1)}$$

Where: TAS=Aircraft True Airspeed, g=Gravitational constant, and Bank Angle=Bank used in a turning escape. It should be appreciated that other predictive equations and models may be utilized without departing from the scope of the present disclosure.

Figure 3:
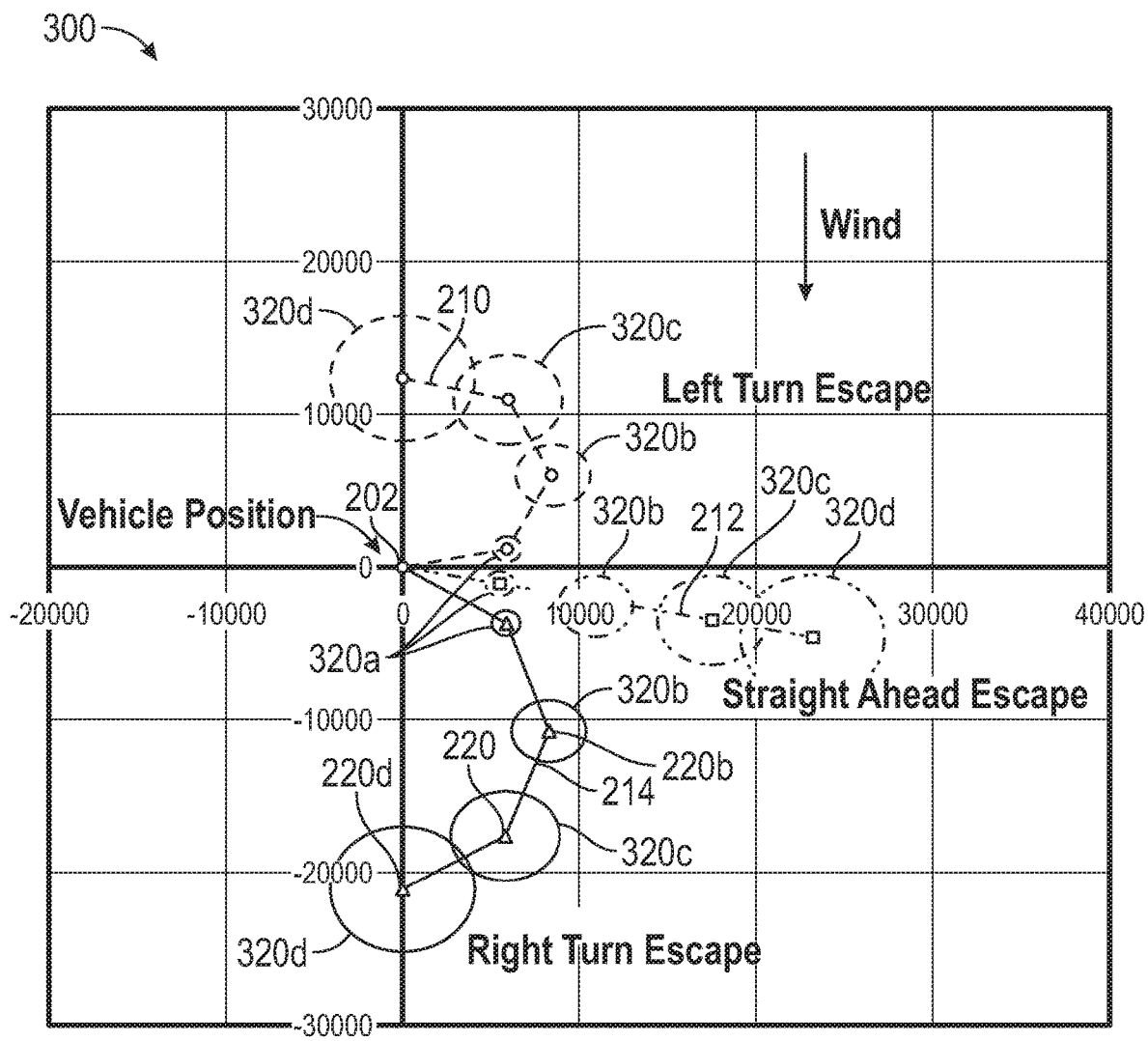
Figure 4:
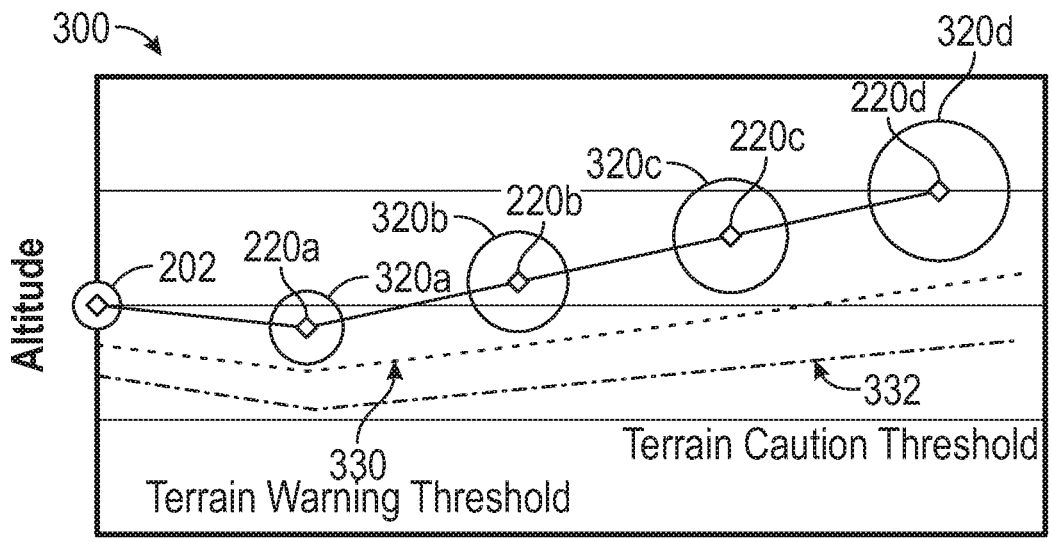

Referring now to FIGS. 3 and 4, and with continued reference to FIGS. 1-2, an updated path prediction system output 300 is illustrated in a top view (FIG. 3) and a side view (FIG. 4). Updated path prediction system output 300 is similar to path prediction system output 200, where like numbers refer to like components. Updated path prediction system output 300, however, includes uncertainty variations 320a, 320b, 320c, 320d for each respective position 220a-d. For example, when realistic uncertainties regarding the aircraft modeling and measurements are accounted for, the trajectories expand during the progress of the escape maneuver as represented by the uncertainty variations 320a-d. In other words, the actual position of aircraft 100 after accounting for such uncertainties may be anywhere within the respective uncertainty variations 320a-d extending from the respective position 220a-d.

The vertical components of the escape trajectories are determined using the current climb capability of the vehicle as shown in FIG. 4. The expanding uncertainties of the 12 points define three escape trajectories that can be evaluated against the terrain data using traditional means when provided to the TAWS. A terrain proximity warning would then be issued when all three of the escape trajectories are found to be proximate to terrain. Additional levels of terrain warning can be issued when all three trajectories are found to cross some more proximate threshold. For example, control system 110 may issue a warning when any of uncertainty variations 320a-d goes below a warning threshold 330 altitude. Similarly, control system 110 may issue a caution when any of uncertainty variations 320a-d goes below a caution threshold 332 altitude. Further, because the trajectories use distinctly different escape methods, the terrain warning can be made more useful by indicating to the operator the preferred direction of recovery (left turn, straight, right turn) based on the margin between the respective threshold and the least optimistic point within uncertainty variations 320a-d.

Figure 5:
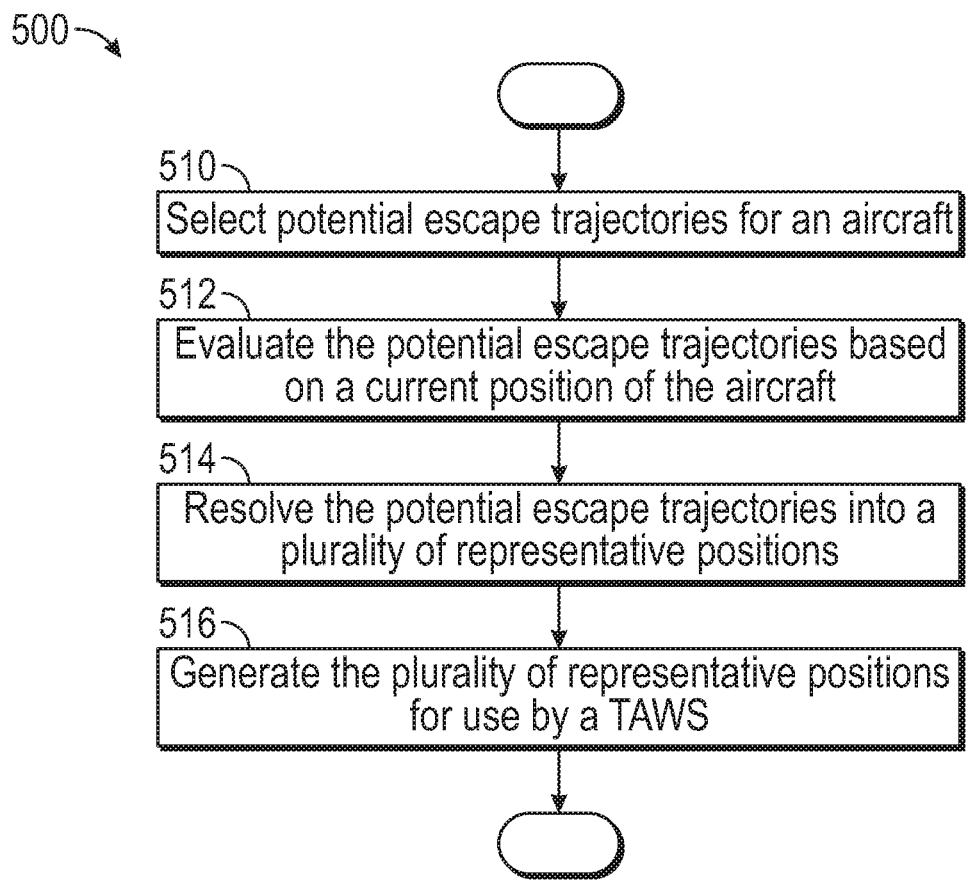
FIGS. 5-6 are flow charts illustrating methods performed by the control system of FIG. 1, in accordance with various embodiments.

Referring now to FIG. 5, and with continued reference to FIGS. 1-3, a method 500 of generating data for a TAWS is illustrated in accordance with the teachings of the present disclosure. In the example provided, method 500 is performed by trajectory modeling system 116 of control system 110.

Task 510 selects potential escape trajectories for an aircraft. For example, trajectory modeling system 116 may select potential escapes 210, 212, and 214 as the potential escape trajectories. Task 512 evaluates the potential escape trajectories based on a current position of the aircraft. For example, trajectory modeling system 116 may calculate a path aircraft 100 will follow from current position 202 when executing each of the potential escapes 210, 212, and 214.

It should be appreciated that alternative potential escape trajectories may be selected. For example, the potential escape trajectories may be selected such that so long as the operator could have the intent and the ability to maneuver to avoid terrain, there is no reason to give a terrain warning. A necessary terrain warning is one given when terrain is approaching that cannot be avoided unless immediate action is taken no matter what type of avoidance maneuver is used. The warning provides the cue that action must be taken at that moment while time still exists to avoid terrain regardless of previous operator intent. Therefore, instead of trying to intuit the operator's intent, it is only necessary to understand what terrain avoidance maneuvers are available within the performance envelope of the vehicle and provide a warning prior to exhausting all those maneuver options.

In the example provided, the potential escape trajectories are selected to be within the aircraft's current maneuvering capability under the present circumstances when evaluating the range of terrain avoidance options. The potential escape maneuvers reflect the actual capability of the host vehicle in order to determine when a terrain warning is appropriate. Accordingly, trajectory modeling system 116 may predict one or more potential escape trajectories using actual current maneuver and performance capability of the vehicle to determine the range of possible future positions of the vehicle.

Task 514 resolves the potential escape trajectories into a plurality of representative positions. For example, trajectory modeling system 116 may translate each of the evaluated potential escapes 210, 212, 214 into a three dimensional (vertical and horizontal) trajectory that can be compared to the local terrain at the same horizontal positions. In the example provided, trajectory modeling system 116 resolves escapes 210, 212, and 214 into the four positions 220a-d. As described above, fewer than three positions or more than four positions may be utilized without departing from the scope of the present disclosure.

Task 516 generates the plurality of representative positions for use by a TAWS. For example, trajectory modeling system 116 may generate the four positions 220a-d for use by TAWS 117.

Figure 6:
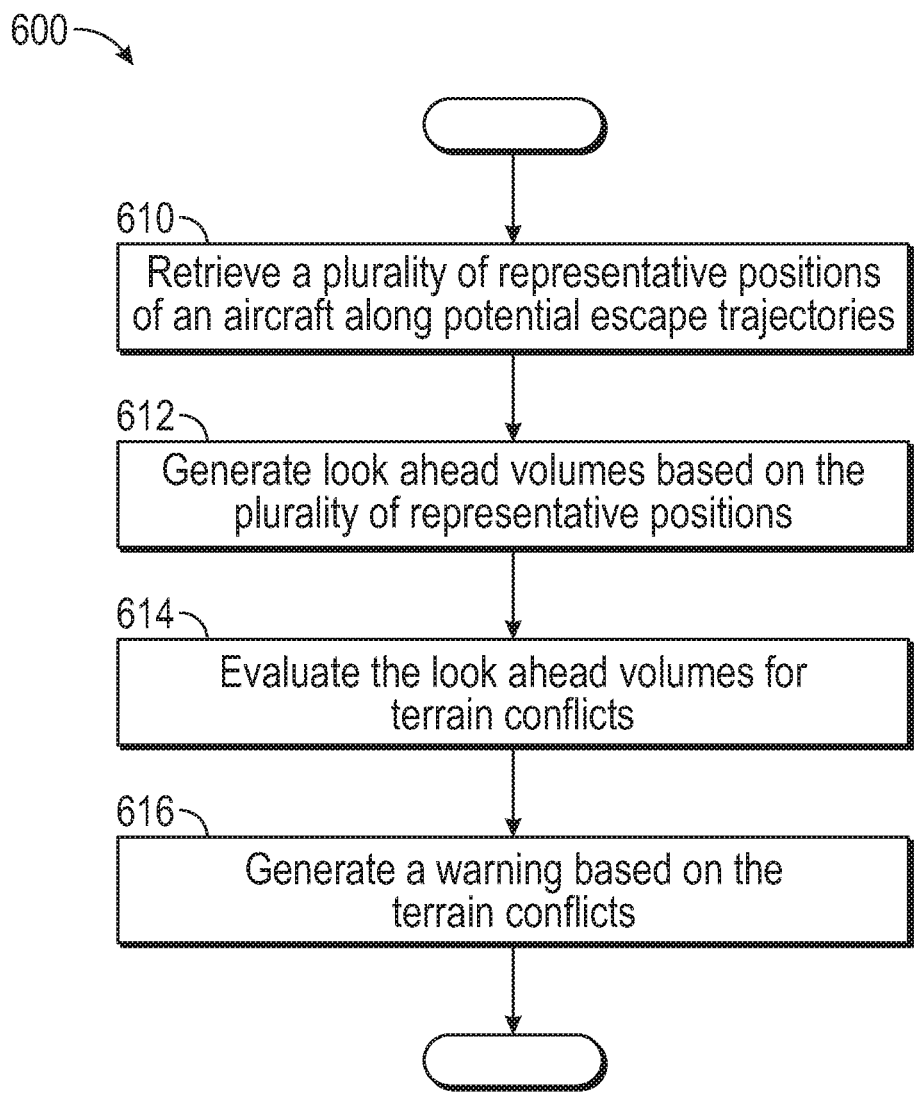

Referring now to FIG. 6, and with continued reference to FIGS. 1-5, a method 600 of evaluating data from an escape trajectory evaluation system is illustrated in accordance with the teachings of the present disclosure. In the example provided, method 600 is performed by TAWS 117. In general, TAWS 117 is similar to conventional TAWS software, but has been modified to generate a look ahead volume shape based on the representative positions provided by trajectory modeling system 116 and to evaluate the representative positions for each of the potential escape trajectories prior to determining whether to generate a warning.

Task 610 retrieves a plurality of representative positions of an aircraft along potential escape trajectories. For example, TAWS 117 may receive four positions 220a-d for each of potential escapes 210, 212, and 214. It should be appreciated that TAWS 117 may receive fewer than three positions or more than four positions without departing from the scope of the present disclosure.

Task 612 generates look ahead volumes based on the plurality of representative positions. For example, TAWS 117 may interpolate intermediate positions of each escape trajectory to reconstruct the escape trajectory to be evaluated using conventional TAWS algorithms. For example, TAWS 117 may use linear interpolation or other simple methods to generate the intermediate positions. The reconstructed escape trajectories are then modified by uncertainties in the modeling and conditions to create the look ahead volumes. For example, TAWS 117 may generate uncertainty variations 320a-d based on representative positions 220a-d—e.g., using the reconstructed escape trajectories and the intermediate positions—using conventional look ahead volume calculation techniques or based on error/uncertainty data provided by trajectory modeling system 116.

Task 614 evaluates the look ahead volumes for terrain conflicts. For example, TAWS 117 may compare positions 220a-d with the terrain at future positions 220a-d using traditional terrain scanning methods. In the example provided, TAWS 117 looks for terrain conflicts by determining whether the terrain is within the look ahead volume.

Task 616 generates a warning based on the terrain conflicts. In the example provided, when any of the potential escape maneuvers has adequate terrain margin, the system does not provide a terrain warning because one escape trajectory is still viable and available to the vehicle operator. If none of the potential escape maneuvers provides the desired minimum terrain separation, then TAWS 117 issues a terrain warning. In some embodiments, varying levels of awareness are used based on the amount of terrain clearance on the best trajectory. In some embodiments, TAWS 117 gives guidance on which trajectory has the best terrain margin in order for a pilot or autopilot system to fly the trajectory. In some embodiments, TAWS 117 issues a warning based on a first terrain margin threshold and a caution based on a second terrain margin threshold.

The various embodiments described herein provide a solution to a technical problem. Specifically, providing paths to a TAWS based on actual performance capabilities removes inaccuracies included in a standard assumed recovery for a generic aircraft. The embodiments described herein may also reduce nuisance warnings by generating the warnings only when no evaluated potential recovery provides the safety margin to terrain specified by the TAWS designer.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those of ordinary skill in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

As used herein, the term processor refers to any hardware, software embodied in a medium, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that perform the described algorithms.

It is further noted that the systems and methods may be implemented on various types of data processor environments (e.g., on one or more data processors) which execute instructions (e.g., software instructions) to perform operations disclosed herein. Non-limiting examples include implementation on a single general purpose computer or workstation, or on a networked system, or in a client-server configuration, or in an application service provider configuration. For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. For example, a computer can be programmed with instructions to perform the various steps of the flowcharts described herein. The software components and/or functionality may be located on a single computer or distributed across multiple computers.

The systems' and methods' data (e.g., associations, mappings, data input, data output, intermediate data results, final data results, etc.) may be stored and implemented in one or more different types of computer-implemented data stores, such as different types of storage devices and programming constructs (e.g., memory, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable storage media including computer storage mechanisms (e.g., non-transitory media, such as CD-ROM, diskette, RAM, flash memory, computer's hard drive, etc.) that contain instructions (e.g., software) for use in execution by a processor to perform the methods' operations and implement the systems described herein.

What is claimed is:

1. An avionics system for an aircraft, the avionics system comprising:
    a trajectory modeling system and a Terrain Awareness Warning System (TAWS) in data communication with the trajectory modeling system;

the trajectory modeling system, comprising a first processor, programmed to:
  determine a current performance capability of the aircraft;
  generate potential escape data based on the current performance capability of the aircraft, wherein generating the potential escape data includes:
    generating a plurality of potential escape trajectories for the aircraft based on a current position of the aircraft and the current performance capability of the aircraft;
    reducing each of the potential escape trajectories to a respective plurality of predicted positions; and
    generating respective uncertainty data for each of the plurality of predicted positions; and
  provide, to the TAWS, the plurality of predicted positions and the respective uncertainty data for each of the plurality of predicted positions;
the TAWS, comprising a second processor, programmed to:
  receive, from the trajectory modeling system, the plurality of predicted positions and the respective uncertainty data for each of the plurality of predicted positions;
  generate a plurality of reconstructed escape trajectories from the received plurality of predicted positions, the plurality of reconstructed escape trajectories corresponding to the plurality of potential escape trajectories;
  generate terrain margin thresholds using a TAWS algorithm, wherein generating the terrain margin thresholds includes:
    generating, from the reconstructed escape trajectories, the predicted positions, and the respective uncertainty data for each of the predicted positions, respective uncertainty variations for each of the predicted positions associated with the potential escape trajectories; and
    calculating respective look ahead volumes corresponding to each of the uncertainty variations; and
  generate a first warning based on presence of terrain within a first look ahead volume bounded by a first terrain margin threshold; and
  generate a second warning based on presence of terrain within a second look ahead volume bounded by a second terrain margin threshold smaller than the first terrain margin threshold.

2. The avionics system of claim 1, wherein the trajectory modeling system is further programmed to generate a vertical dimension of at least one of the plurality of predicted positions based on a current altitude, a descent rate, and a climb capability in a current aircraft configuration retrieved from a lookup table.

3. The avionics system of claim 1, wherein the trajectory modeling system is further programmed to generate a first potential escape trajectory, a second potential escape trajectory, and a third potential escape trajectory to define the plurality of potential escape trajectories.

4. The avionics system of claim 3, wherein the trajectory modeling system is further programmed to generate the first potential escape trajectory based on a climbing left escape maneuver, to generate the second potential escape trajectory based on a climbing straight escape maneuver, and to generate the third potential escape trajectory based on a climbing right escape maneuver.

5. The avionics system of claim 4, wherein the trajectory modeling system is further programmed to generate future positions for at least one of the potential escape trajectories using a turn radius equation that determines a turn radius given an expected recovery airspeed and a bank angle according to:

$$\text{Radius of turn} = TAS^2/(g*\text{Tan(bank angle)}),$$

Wherein TAS=True Airspeed of the aircraft, g=Gravitational constant, and the Bank Angle=Bank used in a turning escape.

6. The avionics system of claim 1, wherein the TAWS is further programmed to generate the first or second warning only when the presence of terrain for every one of the plurality of potential escape trajectories is within the first or second terrain margin threshold, respectively.

7. An aircraft, comprising:
  a trajectory modeling system; and
  a Terrain Awareness Warning System (TAWS) in data communication with the trajectory modeling system;
  the trajectory modeling system, comprising a first processor, programmed to:
    determine a current performance capability of the aircraft;
    generate potential escape data based on the current performance capability of the aircraft, wherein generating the potential escape data includes:
      generating a plurality of potential escape trajectories for the aircraft based on a current position of the aircraft and the current performance capability of the aircraft;
      reducing each of the potential escape trajectories to a respective plurality of predicted positions; and
      generating respective uncertainty data for each of the plurality of predicted positions; and
    provide, to the TAWS, the plurality of predicted positions and the respective uncertainty data for each of the plurality of predicted positions;
  the TAWS, comprising a second processor, programmed to:
    receive, from the trajectory modeling system, the plurality of predicted positions and the respective uncertainty data for each of the plurality of predicted positions;
    generate a plurality of reconstructed escape trajectories from the received plurality of predicted positions, the plurality of reconstructed escape trajectories corresponding to the plurality of potential escape trajectories;
    generate terrain margin thresholds using a TAWS algorithm, wherein generating the terrain margin thresholds includes:
      generating, from the reconstructed escape trajectories, the predicted positions, and the respective uncertainty data for each of the predicted positions, respective uncertainty variations for each of the predicted positions associated with the potential escape trajectories; and
      calculating respective look ahead volumes corresponding to each of the uncertainty variations; and
    generate a first warning based on presence of terrain within a first look ahead volume bounded by a first terrain margin threshold; and
    generate a second warning based on the presence of terrain within a second look ahead volume bounded by a second terrain margin threshold smaller than the first terrain margin threshold.

8. The aircraft of claim 7, wherein the trajectory modeling system is further programmed to generate a vertical dimension of at least one of the plurality of predicted positions based on a current altitude, a descent rate, and a climb capability in a current aircraft configuration retrieved from a lookup table.

9. The aircraft of claim 7, wherein the trajectory modeling system is further programmed to generate a first potential escape trajectory, a second potential escape trajectory, and a third potential escape trajectory to define the plurality of potential escape trajectories.

10. The aircraft of claim 9, wherein the trajectory modeling system is further programmed to generate the first potential escape trajectory based on a climbing left escape maneuver, to generate the second potential escape trajectory based on a climbing straight escape maneuver, and to generate the third potential escape trajectory based on a climbing right escape maneuver.

11. The aircraft of claim 10, wherein the trajectory modeling system is further programmed to generate future positions for at least one of the potential escape trajectories using a turn radius equation that determines a turn radius given an expected recovery airspeed and a bank angle according to:

Radius of turn=$TAS^2/(g*\mathrm{Tan}(\mathrm{bank\ angle}))$,

Wherein TAS=True Airspeed of the aircraft, g=Gravitational constant, and the Bank Angle=Bank used in a turning escape.

12. The aircraft of claim 7, wherein the TAWS is further programmed to generate the first or second warning only when the presence of terrain for every one of the plurality of potential escape trajectories is within the first or second terrain margin threshold, respectively.

13. A method, comprising:
with a trajectory modeling system comprising a first processor:
determining a current performance capability of an aircraft;
generating potential escape data based on the current performance capability of the aircraft, wherein generating the potential escape data includes:
generating a plurality of potential escape trajectories for the aircraft based on a current position of the aircraft and the current performance capability of the aircraft;
reducing each of the potential escape trajectories to a respective plurality of predicted positions; and
generating respective uncertainty data for each of the plurality of predicted positions; and
provide, to a Terrain Awareness Warning System (TAWS), the plurality of predicted positions and the respective uncertainty data for each of the plurality of predicted positions;
with the TAWS comprising a second processor:
receiving, from the trajectory modeling system, the plurality of predicted positions and the respective uncertainty data for each of the plurality of predicted positions;
generating reconstructed escape trajectories from the received plurality of predicted positions, wherein the reconstructed escape trajectories correspond to the potential escape trajectories;
generating terrain margin thresholds using a TAWS algorithm, wherein generating the terrain margin thresholds includes:
generating, from the reconstructed escape trajectories, the predicted positions, and the respective uncertainty data for each of the predicted positions, respective uncertainty variations for each of the predicted positions associated with the potential escape trajectories; and
calculating respective look ahead volumes corresponding to each of the uncertainty variations; and
generating a first warning based on presence of terrain within a first look ahead volume bounded by a first terrain margin threshold; and
generating a second warning based on the presence of terrain within a second look ahead volume bounded by a second terrain margin threshold smaller than the first terrain margin threshold.

14. The method of claim 13, further comprising generating a vertical dimension of at least one of the plurality of predicted positions based on a current altitude, a descent rate, and a climb capability in a current aircraft configuration retrieved from a lookup table.

15. The method of claim 13, further comprising generating future positions for at least one of the potential escape trajectories using a turn radius equation that determines a turn radius given an expected recovery airspeed and a bank angle according to:

Radius of turn=$TAS^2/(g*\mathrm{Tan}(\mathrm{bank\ angle}))$,

Wherein TAS=True Airspeed of the aircraft, g=Gravitational constant, and the Bank Angle=Bank used in a turning escape.

* * * * *